United States Patent
Freeman

(10) Patent No.: US 11,593,713 B2
(45) Date of Patent: Feb. 28, 2023

(54) FRAMEWORK FOR CHOOSING THE APPROPRIATE GENERALIZED LINEAR MODEL

(71) Applicant: Verint Americas Inc., Alpharetta, GA (US)

(72) Inventor: Cynthia Freeman, Spokane Valley, WA (US)

(73) Assignee: Verint Americas, Inc., Alpharetta, GA (US)

( * ) Notice: Subject to any disclaimer, the term of this patent is extended or adjusted under 35 U.S.C. 154(b) by 135 days.

(21) Appl. No.: 16/897,400

(22) Filed: Jun. 10, 2020

(65) Prior Publication Data

US 2020/0401940 A1 Dec. 24, 2020

Related U.S. Application Data

(60) Provisional application No. 62/862,950, filed on Jun. 18, 2019.

(51) Int. Cl.
    *G06N 20/00* (2019.01)
    *G06F 17/18* (2006.01)

(52) U.S. Cl.
    CPC ............. *G06N 20/00* (2019.01); *G06F 17/18* (2013.01)

(58) Field of Classification Search
    CPC ......... G09N 20/00; G06F 17/18; G06F 3/038; G09G 5/00
    See application file for complete search history.

(56) References Cited

U.S. PATENT DOCUMENTS

| | | | |
|---|---|---|---|
| 2014/0329767 A1* | 11/2014 | Kubow | A61K 36/81 514/27 |
| 2017/0004409 A1* | 1/2017 | Chu | G06N 7/005 |
| 2018/0293295 A1* | 10/2018 | Rais-Ghasem | G06F 16/212 |
| 2019/0325310 A1* | 10/2019 | Lilley | G06N 3/082 |

FOREIGN PATENT DOCUMENTS

EP 3451232 3/2019

OTHER PUBLICATIONS

Sáez-Castillo, A. J., et al., "A hyper-Poisson regression model for overdispersed and underdispersed count data," Computational Statistics and Data Analysis, vol. 61, 2013, pp. 148-157.

International Search Report and Written Opinion, dated Oct. 5, 2020, received in connection with International Patent Application No. PCT/US2020/036931.

Cameron, A. C., et al., "Essentials of Count Data Regression," A Companion to Theoretical Econometrics, vol. 331, 1999, 17 pages.

(Continued)

*Primary Examiner* — Pegeman Karimi
(74) *Attorney, Agent, or Firm* — Meunier Carlin & Curfman LLC

(57) ABSTRACT

Systems and methods are provided framework for automatically choosing the appropriate generalized linear model (GLM) given a time series of count data, and for anomaly detection on time series data. A dispersion parameter is determined and used to determine whether the count data is overdispersed data or underdispersed data. The overdispersed data or the underdispersed data is used to determine a GLM to apply on the dataset. Using the determined GLM on the data, anomalies can be determined.

18 Claims, 7 Drawing Sheets

(56) References Cited

OTHER PUBLICATIONS

Faddy, M. J., "Extended Poisson Process Modelling and Analysis of Count Data," Biometrical Journal, vol. 39, No. 4, 1997, pp. 431-440.

Famoye, F., "Restricted generalized poisson regression model," Communications in Statistics Theory and Methods, vol. 22, No. 5, 1993, pp. 1335-1354.

Lambert, D., "Zero-Inflated Poisson Regression, With an Application to Defects in Manufacturing," Technometrics, vol. 34, No. 1, 1992, 14 pages.

Nelder, J. A., et al., "Generalized Linear Models," Journal of the Royal Statistical Society: Series A (General), vol. 135, Part 3, 1972, pp. 370-384.

Ridout, M., et al., "Models for count data with many zeros," Proceedings of the XIXth International Biometric Conference, vol. 19, 1998, pp. 179-192.

Seabold, S., et al., "Statsmodels: Econometric and Statistical Modeling with Python," Proceedings of the 9th Python in Science Conference, vol. 57, 2010, pp. 57-61.

Shmueli, G., et al., "A useful distribution for fitting discrete data: revival of the Conway-Maxwell-Poisson distribution," Journal of the Royal Statistical Society: Series C (Applied Statistics), vol. 54, Part 1, 2005, pp. 127-142.

Xekalaki, E., et al., "The Generalized Waring Process and Its Application," Communications in Statistics—Theory and Methods, vol. 37, No. 12, 2008, pp. 1835-1854.

\* cited by examiner

FRAMEWORK FOR CHOOSING THE APPROPRIATE GENERALIZED LINEAR MODEL

CROSS-REFERENCE TO RELATED APPLICATIONS

This application claims the benefit of priority to U.S. Provisional Patent Application No. 62/862,950, filed on Jun. 18, 2019, entitled "FRAMEWORK FOR CHOOSING THE APPROPRIATE GENERALIZED LINEAR MODEL," the contents of which are hereby incorporated by reference in its entirety.

BACKGROUND

Generalized Linear Models (GLMs) are a large class of models consisting of three components: the random component, the systematic component, and the link function. The random component is the exponential probability distribution of the response variable Y. The systematic component specifies the linear combination of explanatory variables: $\beta_0+\beta_1X_1+\beta_2X_2 \ldots +\beta_kX_k$. The link function g combines the random and systematic components by specifying how the expected value of Y relates to the linear predictor: $g(\mu_Y)=\beta_0+\beta_1X_1+\beta_2X_2 \ldots +\beta_kX_k$.

For example, a simple linear regression uses a normal random component and the identity link function: $g(\mu_Y)=\mu_Y=\beta_0+\beta_1X_1+\beta_2X_2 \ldots +\beta_kX_k$. A Poisson or negative binomial regression uses a Poisson (or negative binomial) random component and a log link function: $g(\mu_Y)=\log(\mu_Y)=\beta_0+\beta_1X_1+\beta_2X_2 \ldots \beta_kX_k$. The GLM regression determines the most likely $\beta$ coefficients for the data usually with maximum likelihood estimation. Other methods, however, can be used.

There are many choices for random components (all members of the exponential family are viable such as normal, exponential, gamma, chi-squared, beta, Poisson, etc.) and link functions, creating quite a number of GLMs. This can make it difficult to determine which GLM to use given a dataset. Another obstacle is the lack of adequate documentation. For example, Statsmodels' (a Python module that provides classes and functions for the estimation of many different statistical models) documentation is sparse and assumes the user has adequate statistical background.

SUMMARY

Systems and methods are provided framework for automatically choosing the appropriate generalized linear model given a time series of count data. Aspects described herein can be used to perform anomaly detection on time series data.

In an implementation, a method for determining a generalized linear model (GLM) to apply on a dataset is provided. The method comprises: receiving a dataset comprising count data by a computing device; determining whether the count data is overdispersed data or underdispersed data by the computing device; and using the overdispersed data or the underdispersed data to determine a GLM to apply on the dataset by the computing device.

In an implementation, a system for determining a generalized linear model (GLM) to apply on a dataset is provided. The system comprises: a dispersion determination module that determines whether the count data is overdispersed data or underdispersed data; and a GLM selector module that uses the overdispersed data or the underdispersed data to determine a GLM to apply on the dataset.

In an implementation, a method for determining an anomaly in a dataset is provided. The method comprises: receiving a dataset comprising a time series of count data by a computing device; determining whether the count data is overdispersed data or underdispersed data by the computing device; using the overdispersed data or the underdispersed data to determine a generalized linear model (GLM) to apply on the dataset by the computing device; applying the GLM on the dataset to generate a result by the computing device; and determining that an anomaly exists in the dataset using the result by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Systems and methods are provided for automatically choosing the appropriate generalized linear model (GLM) given a time series of count data. Aspects focus on counting data and outlining a framework for automatically choosing the appropriate GLM. This framework can be applied to any kind of time series involving count data. Aspects described herein can be used to perform anomaly detection on time series data.

Figure 1:
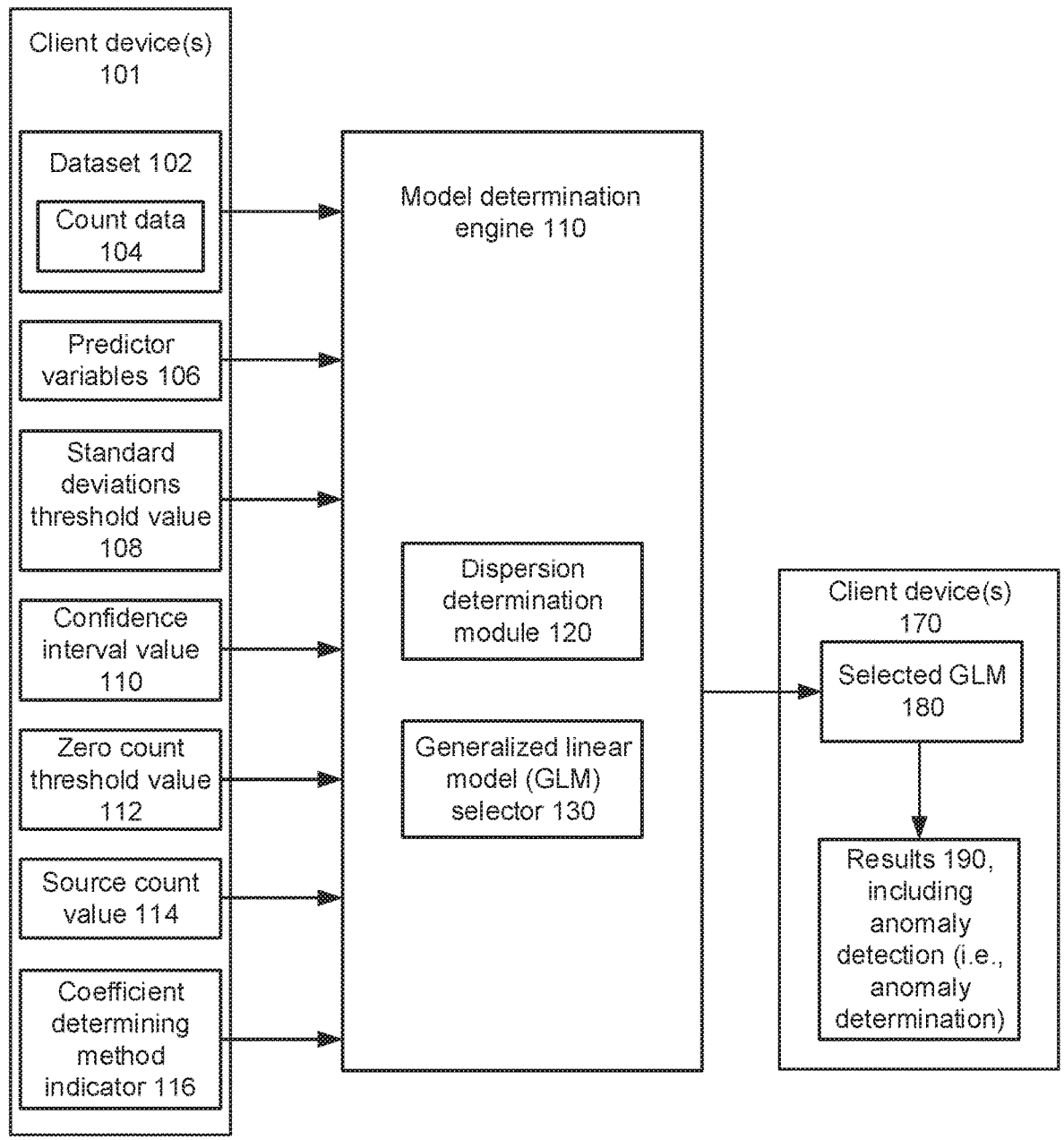
FIG. 1 is an illustration of an exemplary environment for automatically choosing the appropriate generalized linear model (GLM) given a time series of count data and determining anomalies in the count data.

FIG. 1 is an illustration of an exemplary environment 100 for automatically choosing the appropriate GLM given a time series of count data and determining anomalies in the count data. The environment 100 may include a model determination engine 110, data input, received, and/or used by the model determination engine 110, and data output or provided by the model determination engine 110, as well as one or more client devices 101, 170.

The model determination engine may be in communication with one or more client devices 101, 170 through a network. The network may be a variety of network types including the public switched telephone network (PSTN), a cellular telephone network, and a packet switched network (e.g., the Internet). The one or more client devices 101, 170 may provide some or all of the data input, received, and/or used by the model determination engine 110, and/or may receive and/or provide some or all of the data output or provided by the model determination engine 110. Although only model determination engine 110 is shown in FIG. 1, there is no limit to the number of model determination engines 110, as well as client devices 101, 170, that may be supported.

Figure 7:
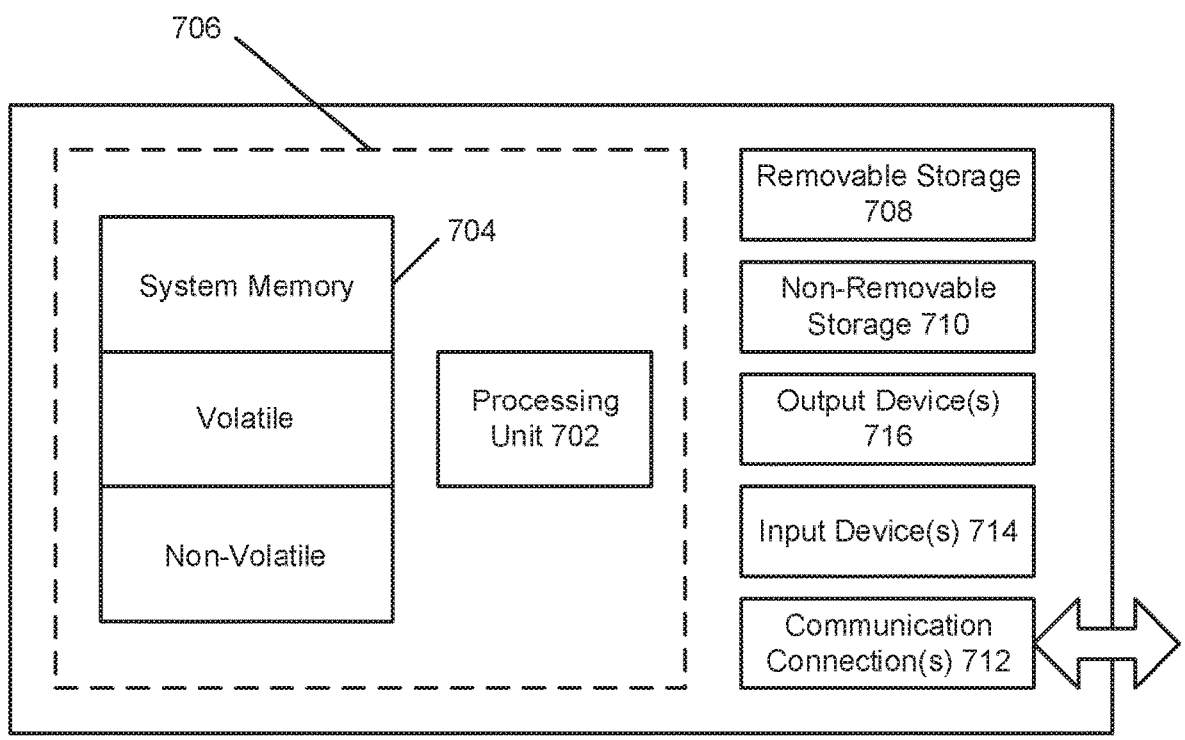
FIG. 7 shows an exemplary computing environment in which example embodiments and aspects may be implemented.

Each of the client devices 101, 107 and the model determination engine 110 may be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 7 as the computing device 700.

The model determination engine 110 comprises a dispersion determination module 120 and a GLM selector 130.

Data that is input to the model determination engine 110 includes a dataset 102 comprising count data 104. In some implementations, the dataset 102 is a time series of count data. Other data input to the model determination engine 110 includes, depending on the implementation, one or more predictor variables 106, a standard deviations threshold value 108, a confidence interval value 110, a zero count threshold value 112, a source count value 114, and a coefficient determining method indicator 116.

In an implementation, the model determination engine 110 takes as input the following: the dataset which comprises a list, ts, which is a time series comprising the count data 104; the predictor variables 106 which are optional and may be a lists of lists, pv, that if not provided is an increasing list of counts to represent the time steps for ts; the standard deviations threshold value 108 which is an integer, $num_{std}$, wherein if a dispersion parameter is $num_{std}$ standard deviations away from 1, there is evidence of overdispersion or underdispersion; the confidence interval value 110, which may be referred to as a float, ci, which is the confidence interval for a determination for the negative binomial (e.g., does the user want a 95% confidence interval, a 99% confidence interval, etc.); the zero count threshold value 112, which is an integer $thresh_0$, wherein if the number of zeroes in the time series exceeds $thresh_0$, GLMs built for excessive zeroes will be considered such as zero-inflated or hurdle models; the source count value 114, which is an integer that is 1 or 2, source, which is the number of potential sources of zero counts, wherein if equal to 1, use hurdle models, and if equal to 2, use zero-inflated models; and the coefficient determining method indicator 116 which may be a string, method, which is the methodology for determining coefficients for the model (e.g., MLE (maximum likelihood estimation), MAP (maximum a posteriori)).

Data that is output or otherwise provided by the model determination engine 110 includes a selected GLM 180 and/or results 190. The results 190 may include anomaly detection (also referred to as anomaly determination) in the dataset.

Aspects described herein can be used to perform anomaly detection on time series data involving counts. An example of time series data may be a time series that tracks the number of times per hour a particular intent (e.g., in an intelligent virtual agent (IVA) in a call center or a contact center) is encountered (e.g., received). Embodiments determine a GLM that fits well with the time series data. Using the determined GLM on the time series data, anomalies can be determined. For example, if the time series data is a predetermined number (e.g., three) of standard deviations above the mean of the determined GLM, then one could consider (i.e., detect or otherwise determine) that an anomaly has occurred.

A GLM decision is based on two factors: dispersion and quantity of zero counts. For count data, the typical first go-to model is Poisson regression. One cannot use something like ordinary linear regression because count data is discrete but the response variable of ordinary linear regression is continuous. However, Poisson models assume that the mean and variance are equivalent. It is very common that this is not the case in real world datasets. When the variance exceeds the mean, one has overdispersed data. When the mean exceeds the variance, one has underdispersed data. Overdispersion tends to be more common; the systems and methods provided herein can handle both cases. Many statistical libraries provide information on the goodness of fit but determining whether or not the data is overdispersed or underdispersed from the summary results is not always straightforward.

To determine overdispersion or underdispersion, use a dispersion parameter which is equivalent to $(\chi^2)$/Df Residuals. Pearson chi-squared $(\chi^2)$ represents the sum of the squares of the residuals of the model. The residuals are scaled measures of the error between observations and means. Df Residuals represents the residual degrees of freedom n-p-1 where n is the number of observations and p is the number of regressors. If the dispersion parameter is close to 1, this indicates that the mean is equal to the variance. If greater than 1, it is determined to be overdispersion. If less than 1, it is determined to be underdispersion.

The definition of how close is close enough to 1 is not widely available in the literature. For this reason, determine how many standard deviations away from 1 the dispersion parameter is where the standard deviation of $\chi_k^2$ is $\sqrt{2k}$. In this situation, k is Df Residuals. The user may determine how many standard deviations away from 1 is acceptable.

In the case where there is overdispersion and not an abundance of zero counts, a negative binomial regression may be used which can specify the extent to which the variance exceeds the mean: $\sigma^2=\mu+\alpha*\mu^2$, where $\sigma^2$ is the variance and $\mu$ is the mean. If $\alpha$ is set to 0, a Poisson regression is obtained which is a special case of negative binomial regression. To automatically determine $\alpha$, use the known test: (1) fit to a Poisson model and obtain the fitted means $\mu$; (2) perform ordinary least squares regression: $(y_i-\mu_i)^2/\mu_i=\alpha\mu_i+\epsilon_i$, where the left hand side is the response, $\alpha$ is unknown, and $\epsilon$ is the error; and (3) construct a confidence interval for $\alpha$ which has a t-distribution. Then select what is in the middle of the confidence interval for a and leave it up to the user on the size of the confidence interval.

A common cause for overdispersion is an abundance of zero counts. In this situation, and as described further herein, use known zero-inflated Poisson/negative binomial models or known hurdle Poisson/negative binomial models. Zero-inflated models comprise two components: a binary distribution that generates structural zeroes and a distribution (Poisson or negative binomial) that could generate zero counts. For hurdle models, there exists only one source of zeroes in the binary component. In other words, only structural zeroes are allowed. Similar to above, the dispersion parameter can be obtained to determine if a Poisson is a good fit for the second component. If the second component using Poisson is overdispersed, a negative binomial can be used for the second component instead. To determine whether or not a hurdle or zero-inflated model should be used, the user will be asked if there is one or two potential sources of zeroes. For example, if a user is modeling the number of children born to a woman, there are two sources of zero counts: (1) the woman may be infertile or (2) the woman is fertile but chose not to have children. In this situation, use a zero-inflated model.

Overdispersion is more common, but if underdispersion is present (very rare), narrow down to the generalized Poisson class of GLMs: such as Faddy Smith ([Faddy, 1997]), Waring ([Xekalaki and Zografi, 2008]), Famoye ([Famoye, 1993]), and Conway-Maxwell ([Shmueli et al., 2005]).

Figure 2:
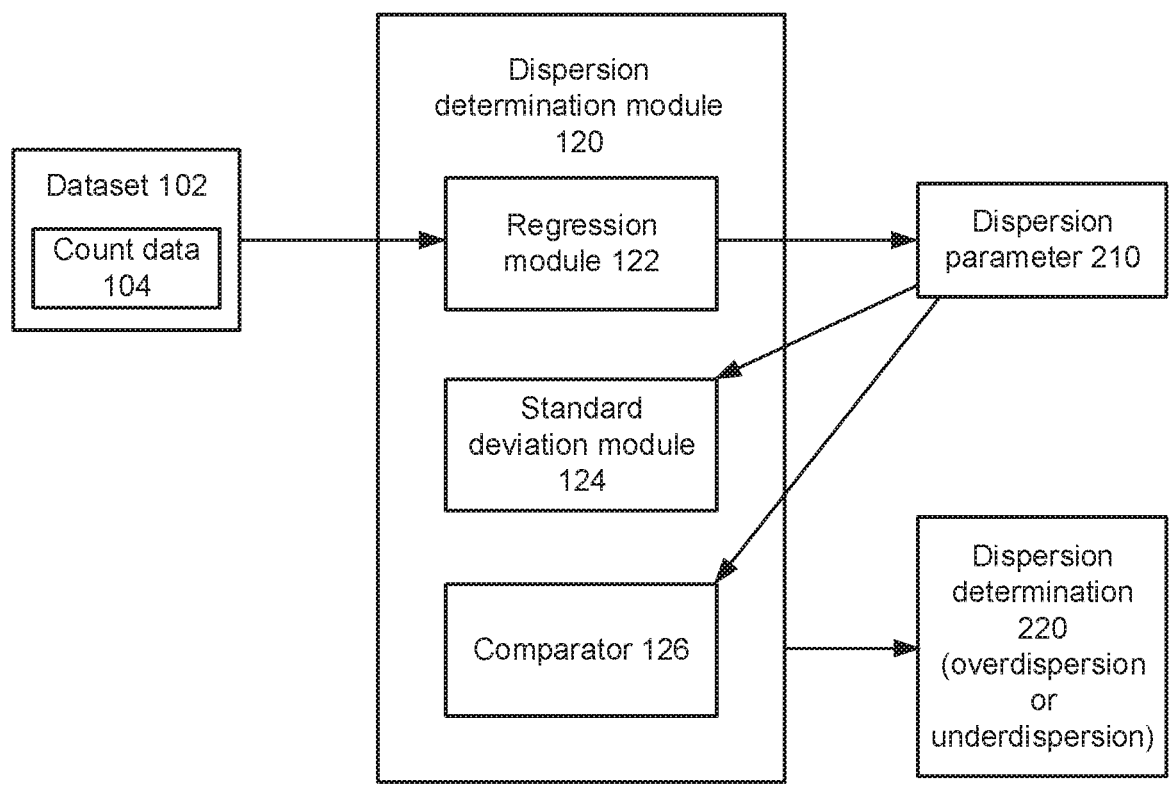
FIG. 2 is an illustration of an exemplary dispersion determination module in an environment for use in automatically choosing the appropriate GLM given a time series of count data.

FIG. 2 is an illustration of an exemplary dispersion determination module 120 in an environment 200 for use in automatically choosing the appropriate GLM given a time series of count data. The dispersion determination module 120 may include a regression module 122, a standard deviation module 124, and a comparator 126.

As described further herein, the regression module 122 may receive the dataset 102 comprising the count data 104 as input, and generate a dispersion parameter 210 as output. The standard deviation module 124 and the comparator 126 may receive and use the dispersion parameter 210 in making a dispersion determination 220 indicating overdispersion or underdispersion. The dispersion determination 220 is provided as output from the dispersion determination module 120 for use by the GLM selector 130.

Figure 3:
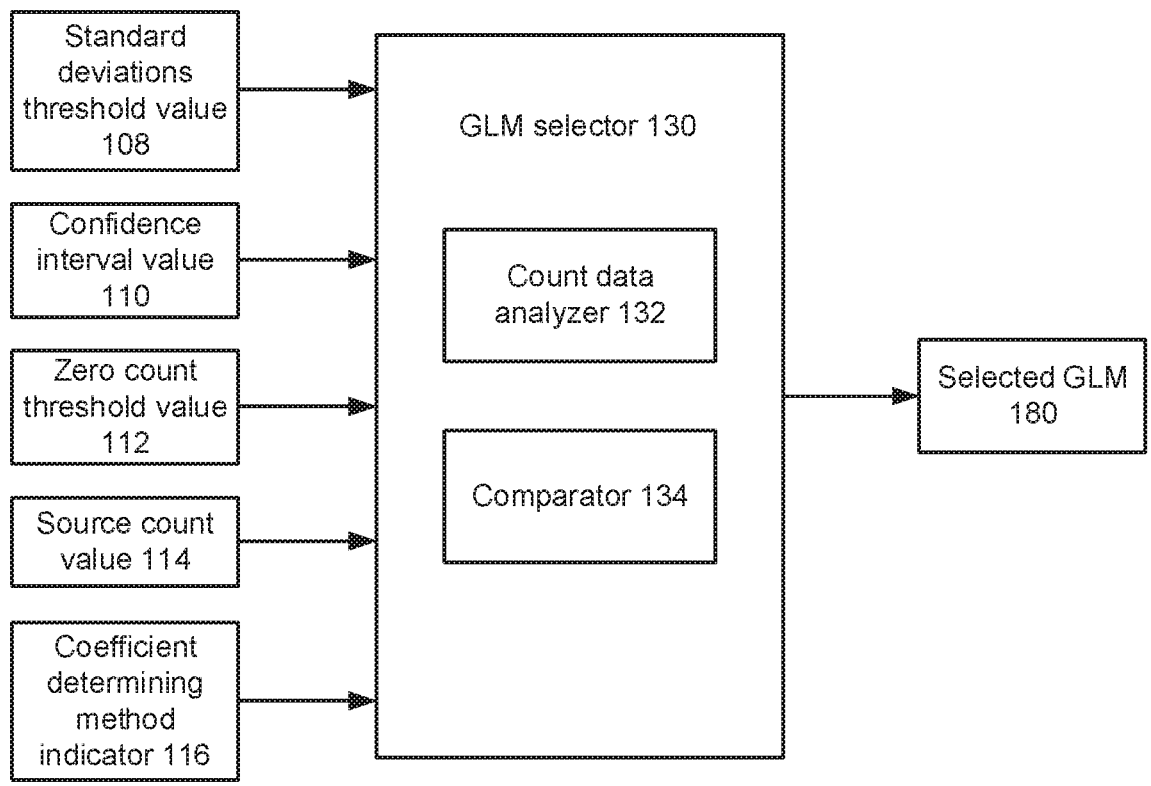
FIG. 3 is an illustration of an exemplary GLM selector in an environment for use in automatically choosing the appropriate GLM given a time series of count data.

FIG. 3 is an illustration of an exemplary GLM selector 130 in an environment 300 for use in automatically choosing the appropriate GLM given a time series of count data. The GLM selector 130 may include a count data analyzer 132 and a comparator 134.

In some implementations, the GLM selector 130 may receive the standard deviations threshold value 108, the confidence interval value 110, the zero count threshold value 112, the source count value 114, and the coefficient determining method indicator 116 as input.

As described further herein, the GLM selector 130 uses the count data analyzer 132 and the comparator 134, in conjunction with the input, to determine the selected GLM 180, which may be provided as output from the GLM selector 130.

Figure 4:
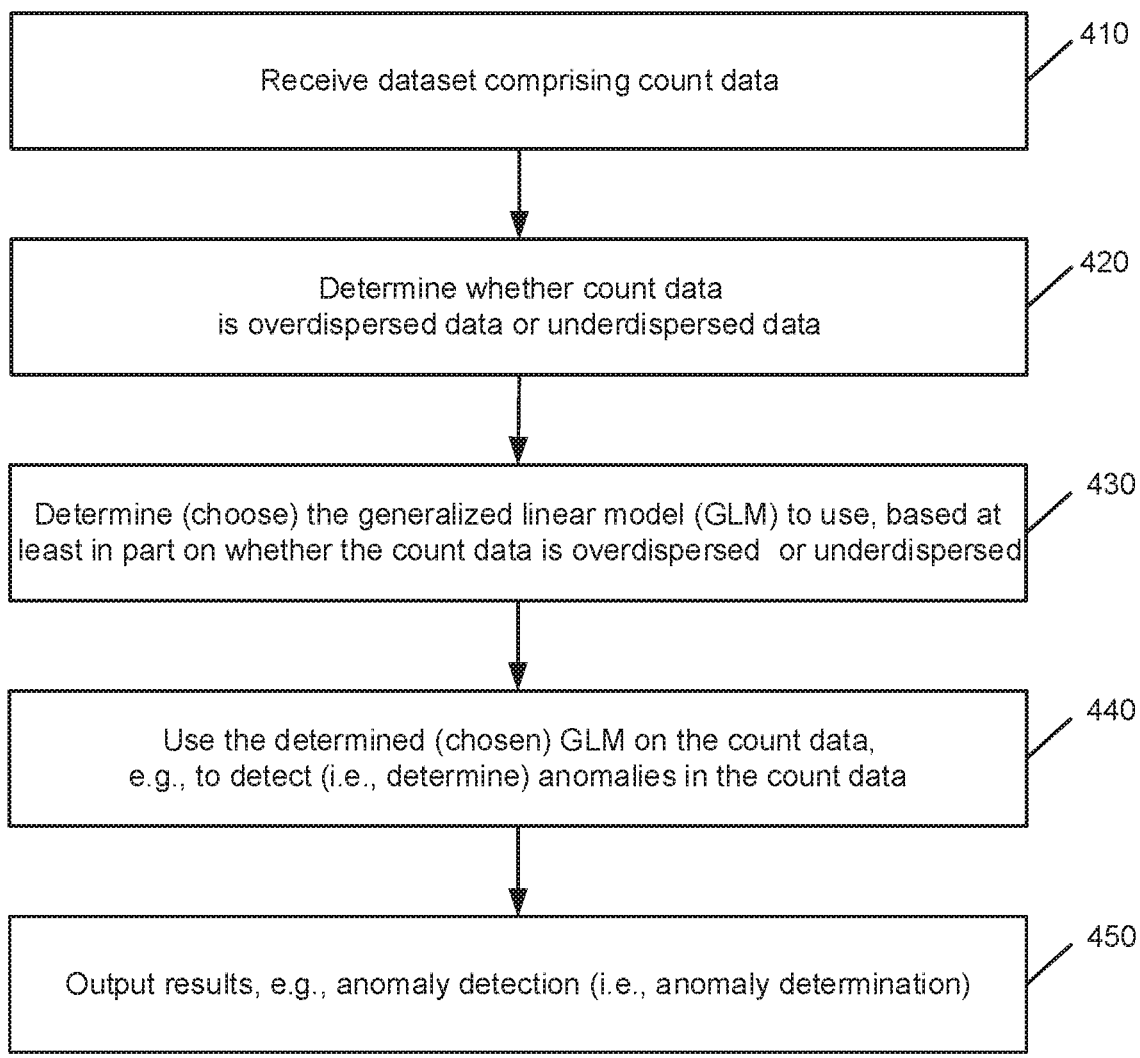
FIG. 4 is an operational flow of an implementation of a method of automatically choosing the appropriate GLM given a time series of count data and providing results such as an anomaly determination.

FIG. 4 is an operational flow of an implementation of a method 400 of automatically choosing the appropriate GLM given a time series of count data and providing results such as an anomaly determination. The method 400 may be performed by the model determination engine 110, in some implementations.

At 410, a dataset comprising count data is received at the model determination engine 110. In some implementations, the dataset 102 is a time series of count data.

At 420, it is determined whether the count data is overdispersed data or underdispersed data. The dispersion determination module 120 may make this determination.

At 430, the GLM to use is determined (i.e., chosen or selected) based, at least in part, on whether the count data is overdispersed or is underdispersed.

At 440, the determined GLM is applied on the count data, and the results are outputted at 450 (e.g., to one or more client devices, such as the client device(s) 170). The results (such as the results 190) may include anomaly determination in the dataset (e.g., the count data of the dataset).

Figure 5:
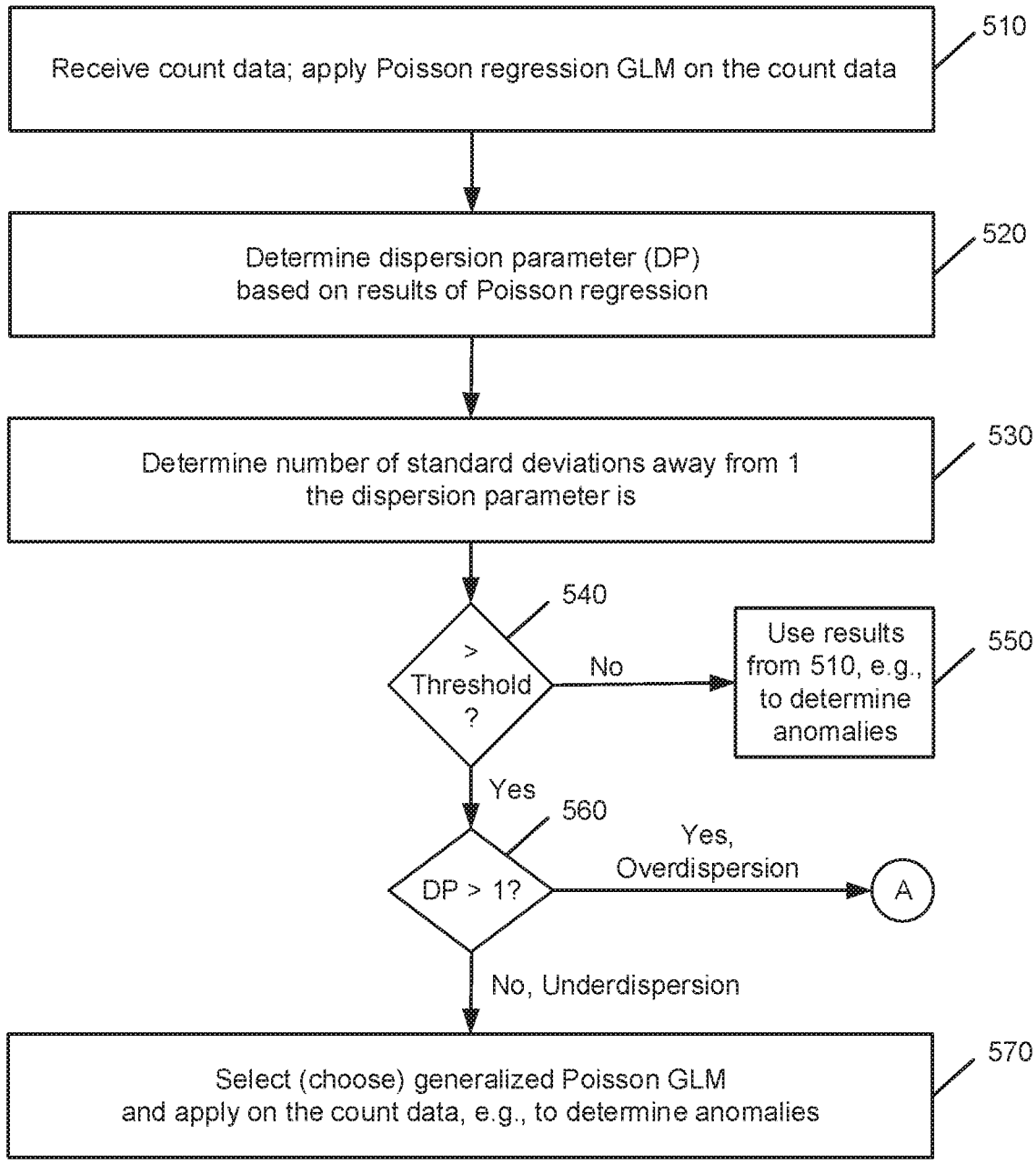
FIGS. 5 and 6 show operational flows comprising another implementation of a method of automatically choosing the appropriate GLM given a time series of count data to determine results such as determining anomalies.
Figure 6:
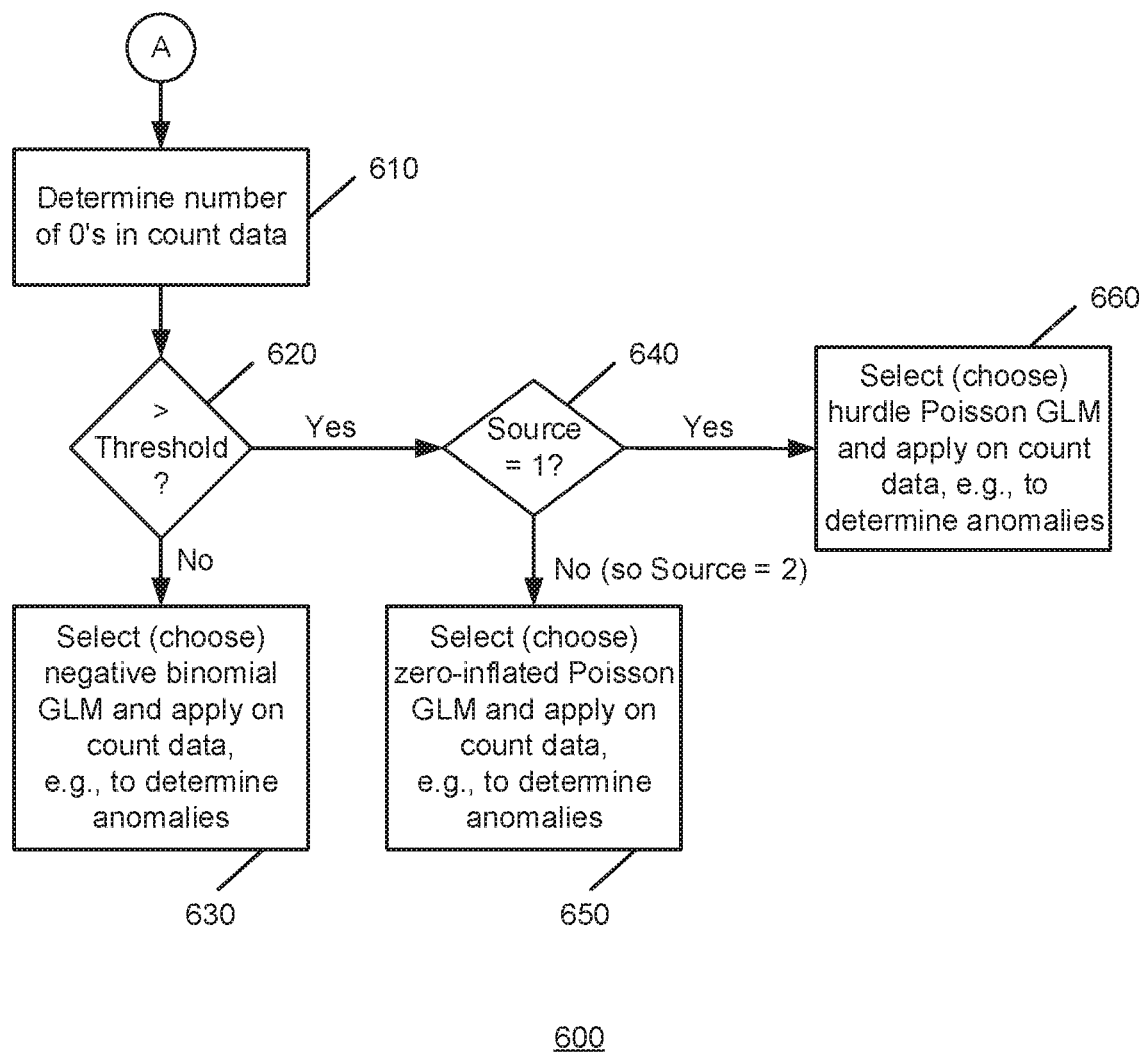

FIGS. 5 and 6 show operational flows comprising another implementation of a method 500, 600 of automatically choosing the appropriate GLM given a time series of count data to determine results such as determining anomalies. The method 500, 600 may be performed by the model determination engine 110, in some implementations.

At 510, the count data is received, and a Poisson regression GLM is applied on the count data. In an implementation, Poisson regression may be applied on is using method. If pv is not included, use pv=[[1,2,3 . . . length(ts)]].

At 520, the dispersion parameter is determined based on the results of the Poisson regression. In an implementation, the dispersion parameter may be obtained from 510 using $(\chi^2)$/Df Residuals.

At 530, the number of standard deviations away from 1 that the dispersion parameter is, is determined. In an implementation, how many standard deviations from 1 the dispersion parameter is may be determined using a standard deviation of $\sqrt{2*\text{DfResiduals}}$.

At 540, it is determined whether the number of standard deviations determined from 530 is greater than a predetermined threshold. In an implementation, if the number of standard deviations is less than $\text{num}_{std}$, then processing ends. If the number of standard deviations is greater than $\text{num}_{std}$, then determine if the dispersion parameter is greater than or less than 1. If greater, it is determined to be overdispersion and processing continues at 610. If less, it is determined to be underdispersion and processing continues at 570.

Thus, at 550, responsive to the determination at 540 that the dispersion parameter is less than (i.e., not equal to or greater than) the threshold number of standard deviations away from 1, the results from 510 are used. In other words, the Poisson regression GLM is selected (i.e., determined or chosen), and the Poisson regression GLM is applied to the count data (which was performed in 510) and these results may be outputted (e.g., to one or more client devices, such as the client device(s) 170). The results (such as the results 190) may include anomaly determination in the dataset (e.g., the count data of the dataset).

At 560, responsive to the determination at 540 that the dispersion parameter is greater than (or equal to) the threshold number of standard deviations away from 1, it is determined whether the dispersion parameter is greater than one. If the dispersion parameter is greater than (or equal to) one, then it is determined that there is overdispersion (i.e., the data is overdispersed, resulting in overdispersion data), and processing continues at 610 in FIG. 6.

If it has been determined at 560 that the dispersion parameter is less than one (i.e., not greater than or equal to one), then it is determined that there is underdispersion (i.e., the data is underdispersed, resulting in underdispersion data), and a generalized Poisson GLM is selected (i.e., chosen) and applied on the count data at 570 and these results may be outputted (e.g., to one or more client devices, such as the client device(s) 170). The results (such as the results 190) may include anomaly determination in the dataset (e.g., the count data of the dataset).

At 610, when it has been determined that the dispersion parameter is greater than (or equal to) the threshold number of standard deviations away from 1, and it has been determined that the dispersion parameter is greater than (or equal to) one, then the number of zeroes in the count data is determined.

At 620, it is determined whether the number of zeroes from 610 is greater than a predetermined threshold. Thus, in an implementation, for overdispersion, the number of zeroes in is obtained. If this number is greater than $thresh_0$, processing continues at 640; otherwise, processing continues at 630.

At 630, responsive to the determination at 620 that the number of zeroes in the count data is less than (i.e., not equal to or greater than) the threshold number, then a negative binomial GLM is selected (i.e., chosen) and applied on the count data and these results may be outputted (e.g., to one or more client devices, such as the client device(s) 170). The results (such as the results 190) may include anomaly determination in the dataset (e.g., the count data of the dataset).

At 640, responsive to the determination at 620 that the number of zeroes in the count data is greater than (or equal to) the threshold number, then it is determined if the value of source=1.

At 650, responsive to the determination at 640 the value of source is not equal to 1 (i.e., equal to 2 in some implementations), then a zero-inflated Poisson GLM is selected (i.e., chosen) and applied on the count data and these results may be outputted (e.g., to one or more client devices, such as the client device(s) 170). The results (such as the results 190) may include anomaly determination in the dataset (e.g., the count data of the dataset).

Thus, in an implementation, for overdispersion and a high number of zeros (i.e., above the threshold), if source is 1, apply a hurdle Poisson using method. If the dispersion parameter in the second component is greater than 1 and more than $num_{std}$ standard deviations away, use a hurdle negative binomial model using method, choosing the appropriate a using a known technique (e.g., [Cameron and Trivedi, 2001]). If source is 2, apply a zero-inflated Poisson model using method. If the dispersion parameter in the second component is greater than 1 and more than $num_{std}$ standard deviations away, use a zero-inflated negative binomial model using method choosing the appropriate a using a known technique (e.g., [Cameron and Trivedi, 2001]).

Moreover, in an implementation, for overdispersion and not an overabundance of zeroes (i.e., below the threshold), apply the negative binomial model using method. Determine the appropriate α using a known technique (e.g., [Cameron and Trivedi, 2001]) by obtaining the fitted means from the Poisson regression in 510 and performing ordinary least squares regression on $(y_i-\mu_i)^2/\mu_i=\alpha\mu_i+\epsilon_i$, and choosing the middle point of the ci confidence interval of α which is t-distributed.

At 660, responsive to the determination at 640 that the value of the source=1, then a hurdle Poisson GLM is selected (i.e., chosen) and applied on the count data and these results may be outputted. The results (such as the results 190) may include anomaly determination in the dataset (e.g., the count data of the dataset). In an implementation, employ a generalized Poisson class of GLMs using method.

EXAMPLE APPLICATIONS

Example 1

Track the number of times the "Gift Certificates" intent is hit per hour in conversations between customers and an IVA (e.g., in a call center or a contact center). After fitting to a Poisson GLM using MAP along with predictor variables of day of week and hour of day that are one-hot encoded, obtain a dispersion parameter of 1:01 with 100 residual degrees of freedom. One standard deviation is $\sqrt{2}/100=0.14$ and 1.01−1=.01 which is less than 1 standard deviation away. Poisson is a good fit if $num_{std}$ is set to 1.

Example 2

Track the number of times the "Spokane Airport Map" intent is hit per hour in conversations between customers and an IVA (e.g., in a call center or a contact center). This is a rarely hit intent as this involves information of a specific airport. After fitting to a Poisson GLM using MAP along with predictor variables of day of week and hour of day that are one-hot encoded, obtain a dispersion parameter greater than 1 that is 5 standard deviations away. Given that $num_{std}$ is set to be 1, this is overdispersed. Check the number of zero counts which is significantly larger than $thresh_0$. There is only one source of zeroes: either the intent is hit or not, and if hit, the count automatically has to be 1 or greater. Thus, use a hurdle Poisson or hurdle negative binomial model.

Now that the behavior of these intents have been modeled, one can determine anomalies by finding large residuals between the GLM fitted mean and the observations.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method for determining a generalized linear model (GLM) to apply on a dataset is provided. The method includes receiving a dataset comprising count data by a computing device; determining whether the count data is overdispersed data or underdispersed data by the computing device; and using the overdispersed data or the underdispersed data to determine a GLM to apply on the dataset by the computing device.

Implementations may include some or all of the following features. The count data is a time series of count data. The method further comprises determining when the variance of the count data exceeds the mean of the count data, the count data is overdispersed data, and when the mean of the count data exceeds the variance of the count data, the count data is underdispersed data. Determining whether the count data is overdispersed data or underdispersed data comprises using a dispersion parameter. The dispersion parameter is equivalent to $(\chi^2)/\text{Df}$ Residuals, wherein chi-squared $(\chi^2)$ represents the sum of the squares of the residuals of the model, and Df Residuals represents the residual degrees of freedom n-p-1 where n is the number of observations and p is the number of regressors. The method further comprises determining the count data to be overdispersed data when the dispersion parameter is greater than 1, and determining the count data to be underdispersed data when the dispersion parameter is less than 1. The GLM is determined from a group comprising a Poisson regression GLM, a generalized Poisson GLM, a negative binomial GLM, a zero-inflated Poisson GLM, and a hurdle Poisson GLM. The method further comprises applying the GLM on the dataset and outputting a result of the applying to a client device. Using the overdispersed data or the underdispersed data to determine the GLM comprises using a standard deviations threshold value, a confidence interval value, a zero count threshold value, a source count value, and a coefficient determining method indicator.

In an implementation, a system for determining a generalized linear model (GLM) to apply on a dataset is provided. The system includes a dispersion determination module that determines whether the count data is overdispersed data or underdispersed data; and a GLM selector module that uses the overdispersed data or the underdispersed data to determine a GLM to apply on the dataset.

Implementations may include some or all of the following features. The count data is a time series of count data. When the variance of the count data exceeds the mean of the count data, the count data is overdispersed data, and when the mean of the count data exceeds the variance of the count data, the count data is underdispersed data. The dispersion determination module determines a dispersion parameter, and wherein determining whether the count data is overdispersed data or underdispersed data comprises using the dispersion parameter. The dispersion parameter is equivalent to $(\chi^2)/\text{Df}$ Residuals, wherein chi-squared $(\chi^2)$ represents the sum of the squares of the residuals of the model, and Df Residuals represents the residual degrees of freedom n-p-1 where n is the number of observations and p is the number of regressors. The count data is determined to be overdispersed data when the dispersion parameter is greater than 1, and the count data is determined to be underdispersed data when the dispersion parameter is less than 1. The GLM is determined from a group comprising a Poisson regression GLM, a generalized Poisson GLM, a negative binomial GLM, a zero-inflated Poisson GLM, and a hurdle Poisson GLM. The system further comprises a computing device that applies the GLM on the dataset and outputs a result of the applying to a client device. Using the overdispersed data or the underdispersed data to determine the GLM comprises using a standard deviations threshold value, a confidence interval value, a zero count threshold value, a source count value, and a coefficient determining method indicator.

In an implementation, a method for determining an anomaly in a dataset is provided. The method includes receiving a dataset comprising a time series of count data by a computing device; determining whether the count data is overdispersed data or underdispersed data by the computing device; using the overdispersed data or the underdispersed data to determine a generalized linear model (GLM) to apply on the dataset by the computing device; applying the GLM on the dataset to generate a result by the computing device; and determining that an anomaly exists in the dataset using the result by the computing device.

Implementations may include some or all of the following features. The method further comprises, prior to determining whether the count data is overdispersed data or underdispersed data: applying a Poisson regression GLM on the dataset; determining a dispersion parameter based on the results of the Poisson regression GLM; determining the number of standard deviations away from 1 that the dispersion parameter is; comparing the number of standard deviations to a threshold; and determining the GLM to apply on the dataset using the results of the comparing and the dispersion parameter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining a generalized linear model (GLM) to apply on a dataset, the method comprising:
    receiving a dataset comprising count data by a computing circuit;
    determining whether the count data is overdispersed data or underdispersed data by the computing circuit; and
    using the overdispersed data or the underdispersed data to determine a GLM to apply on the dataset by the computing circuit; and
    determining with the computing circuit that when the variance of the count data exceeds the mean of the count data, the count data is overdispersed data, and when the mean of the count data exceeds the variance of the count data, the count data is underdispersed data.

2. The method of claim 1, wherein the count data is a time series of count data.

3. The method of claim 1, wherein determining whether the count data is overdispersed data or underdispersed data comprises using a dispersion parameter.

4. The method of claim 3, wherein the dispersion parameter is equivalent to $(\chi^2)$/Df Residuals, wherein chi-squared $(\chi^2)$ represents the sum of the squares of the residuals of the model, and Df Residuals represents the residual degrees of freedom n-p-1 where n is the number of observations and p is the number of regressors.

5. The method of claim 4, further comprising determining with the computing circuit that the count data is overdispersed data when the dispersion parameter is greater than 1, and determining the count data to be underdispersed data when the dispersion parameter is less than 1.

6. The method of claim 1, wherein the GLM is determined from a group comprising a Poisson regression GLM, a generalized Poisson GLM, a negative binomial GLM, a zero-inflated Poisson GLM, and a hurdle Poisson GLM.

7. The method of claim 1, further comprising applying the GLM on the dataset and outputting a result of the applying to a client device.

8. The method of claim 1, wherein using the overdispersed data or the underdispersed data to determine the GLM comprises using a standard deviations threshold value, a confidence interval value, a zero count threshold value, a source count value, and a coefficient determining method indicator.

9. A system for determining a generalized linear model (GLM) to apply on a dataset, the system comprising:
    a dispersion determination circuit that determines whether the count data is overdispersed data or underdispersed data; and
    a GLM selector that uses the overdispersed data or the underdispersed data to determine a GLM to apply on the dataset;
    wherein when the variance of the count data exceeds the mean of the count data, the count data is overdispersed data, and when the mean of the count data exceeds the variance of the count data, the count data is underdispersed data.

10. The system of claim 9, wherein the count data is a time series of count data.

11. The system of claim 9, where the dispersion determination circuit determines a dispersion parameter, and wherein determining whether the count data is overdispersed data or underdispersed data comprises using the dispersion parameter.

12. The system of claim 11, wherein the dispersion parameter is equivalent to $(\chi^2)$/Df Residuals, wherein chi-squared $(\chi^2)$ represents the sum of the squares of the residuals of the model, and Df Residuals represents the residual degrees of freedom n-p-1 where n is the number of observations and p is the number of regressors.

13. The system of claim 12, wherein the count data is determined to be overdispersed data when the dispersion parameter is greater than 1, and the count data is determined to be underdispersed data when the dispersion parameter is less than 1.

14. The system of claim 9, wherein the GLM is determined from a group comprising a Poisson regression GLM, a generalized Poisson GLM, a negative binomial GLM, a zero-inflated Poisson GLM, and a hurdle Poisson GLM.

15. The system of claim 9, further comprising a computing circuit that applies the GLM on the dataset and outputs a result of the applying to a client device.

16. The system of claim 9, wherein using the overdispersed data or the underdispersed data to determine the GLM comprises using a standard deviations threshold value, a confidence interval value, a zero count threshold value, a source count value, and a coefficient determining method indicator.

17. A method for determining an anomaly in a dataset, the method comprising:
    receiving a dataset comprising a time series of count data by a computing circuit;
    determining whether the count data is overdispersed data or underdispersed data by the computing circuit;
    using the overdispersed data or the underdispersed data to determine a generalized linear model (GLM) to apply on the dataset by the computing circuit;
    applying the GLM on the dataset to generate a result by the computing circuit; and
    determining that an anomaly exists in the dataset using the result by the computing circuit.

18. The method of claim 17, further comprising, using the computing circuit and prior to determining whether the count data is overdispersed data or underdispersed data:
    applying a Poisson regression GLM on the dataset;
    determining a dispersion parameter based on the results of the Poisson regression GLM;

determining the number of standard deviations away from 1 that the dispersion parameter is;

comparing the number of standard deviations to a threshold; and determining the GLM to apply on the dataset using the results of the comparing and the dispersion parameter.

\* \* \* \* \*